US012614072B2

(12) United States Patent
Sun et al.

(10) Patent No.: US 12,614,072 B2
(45) Date of Patent: Apr. 28, 2026

(54) PRETRAINING SYSTEM AND METHOD FOR SEISMIC DATA PROCESSING USING MACHINE LEARNING

(71) Applicant: KING ABDULLAH UNIVERSITY OF SCIENCE AND TECHNOLOGY, Thuwal (SA)

(72) Inventors: Bingbing Sun, Thuwal (SA); Tariq Ali Alkhalifah, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 385 days.

(21) Appl. No.: 18/029,946

(22) PCT Filed: Oct. 6, 2021

(86) PCT No.: PCT/IB2021/059174
§ 371 (c)(1),
(2) Date: Apr. 3, 2023

(87) PCT Pub. No.: WO2022/079550
PCT Pub. Date: Apr. 21, 2022

(65) Prior Publication Data
US 2023/0376751 A1 Nov. 23, 2023

Related U.S. Application Data

(60) Provisional application No. 63/091,482, filed on Oct. 14, 2020.

(51) Int. Cl.
*G06N 3/08* (2023.01)
*G01V 1/30* (2006.01)

(52) U.S. Cl.
CPC .............. *G06N 3/08* (2013.01); *G01V 1/301* (2013.01)

(58) Field of Classification Search
CPC .......... G06N 3/08; G06N 3/045; G01V 1/301; G01V 1/302; G01V 1/30; G01V 1/345;
(Continued)

(56) References Cited

U.S. PATENT DOCUMENTS 9,633,306 B2 4/2017 Liu et al.
10,948,618 B2* 3/2021 Bandura ................ G01V 1/307
(Continued)

FOREIGN PATENT DOCUMENTS

WO 2020138128 A1 7/2020

OTHER PUBLICATIONS

Yu et al. , Field-of-View Prediction in 360-Degree Videos with Attention-based Neural Encoder-Decoder Networks, 2019 (Year: 2019).*
(Continued)

*Primary Examiner* — Mohammad K Islam
(74) *Attorney, Agent, or Firm* — PATENT PORTFOLIO BUILDERS PLLC

(57) ABSTRACT

A method for processing waveform data for determining a characteristic inside an object includes receiving raw waveform data collected with waveform sensors over a given object; pretraining a first neural network with the raw waveform data so that structural information within the raw waveform data is extracted; receiving a first task to be performed with regard to the object, based on the raw waveform data; fine-tuning a second neural network, based on (1) pretrained parameters from the first neural network, and (2) the first task; and generating an image of the object using the second neural network with refined parameters.

20 Claims, 7 Drawing Sheets

(58) Field of Classification Search

CPC .......... G01V 1/28; G01V 1/307; G01V 1/308; G01V 20/00; G01V 2210/1295; G01V 2210/1429; G01V 2210/60; G01V 2210/63; G01V 2210/64; G01V 2210/643; G01V 2210/66; G01V 2210/74

See application file for complete search history.

(56) References Cited

U.S. PATENT DOCUMENTS

| | | | | |
|---|---|---|---|---|
| 2021/0279576 | A1* | 9/2021 | Shazeer | G06N 3/04 |
| 2021/0374947 | A1* | 12/2021 | Shin | G06N 3/094 |
| 2022/0058466 | A1* | 2/2022 | Yang | G06N 3/0442 |
| 2022/0067513 | A1* | 3/2022 | Stevens | G06F 7/22 |
| 2022/0099855 | A1* | 3/2022 | Li | G01V 1/302 |
| 2023/0408558 | A1* | 12/2023 | Tan | G06N 3/0442 |

OTHER PUBLICATIONS

Cunha, A., et al., "Seismic Fault Detection in Real Data using Transfer Learning from a Convolutional Neural Network Pre-Trained with Synthetic Seismic Data," Computers and Geosciences, Nov. 9, 2019, vol. 135, pp. 1-9, Elsevier Ltd.

Dai, Z., et al., "Transformer-XL: Attentive Language Models Beyond a Fixed-Length Context," arXiv:1901.02860v3 [cs.LG] Jun. 2, 2019, pp. 1-20.

Devlin, J., "BERT: Pre-training of Deep Bidirectional Transformers for Language Understanding," arXiv:1810.04805v2 [cs.CL] May 24, 2019, pp. 1-16.

International Search Report in corresponding/related International Application No. PCT/IB2021/059174, date of mailing Dec. 23, 2021.

Lan, Z., et al., "Albert: A Lite BERT for Self-Supervised Learning of Language Representations," Published as a conference paper at ICLR 2020, arXiv:1909.11942v6 [cs.CL] Feb. 9, 2020, pp. 1-17.

Liu, W., et al., "FastBERT: a Self-distilling BERT with Adaptive Inference Time," arXiv:2004.02178v2 [cs.CL] Apr. 29, 2020, pp. 1-10.

Liu, Y., "RoBERTa: A Robustly Optimized BERT Pretraining Approach," arXiv:1907.11692v1 [cs.CL] Jul. 26, 2019, pp. 1-13.

Mostafa Mousavi, S., et al., "Cred: A Deep Residual Network of Convolutional and Recurrent Unites for Earthquake Signal Detection," arxiv.org, Cornell University Library, Ithaca, NY, Oct. 3, 2018, XP081416741, pp. 1-23.

Radford, A., et al., "Improving Language Understanding with Generative Pre-training," 2018 (downloaded Apr. 1, 2023), https://openai.com/blog/language-unsupervised, pp. 1-15.

Written Opinion of the International Searching Authority in corresponding/related International Application No. PCT/IB2021/059174, date of mailing Dec. 23, 2021.

Yang, Z., et al., "XLNet: Generalized Autoregressive Pretraining for Language Understanding," arXiv:1906.08237v2 [cs.CL] Jan. 2, 2020, pp. 1-18.

* cited by examiner

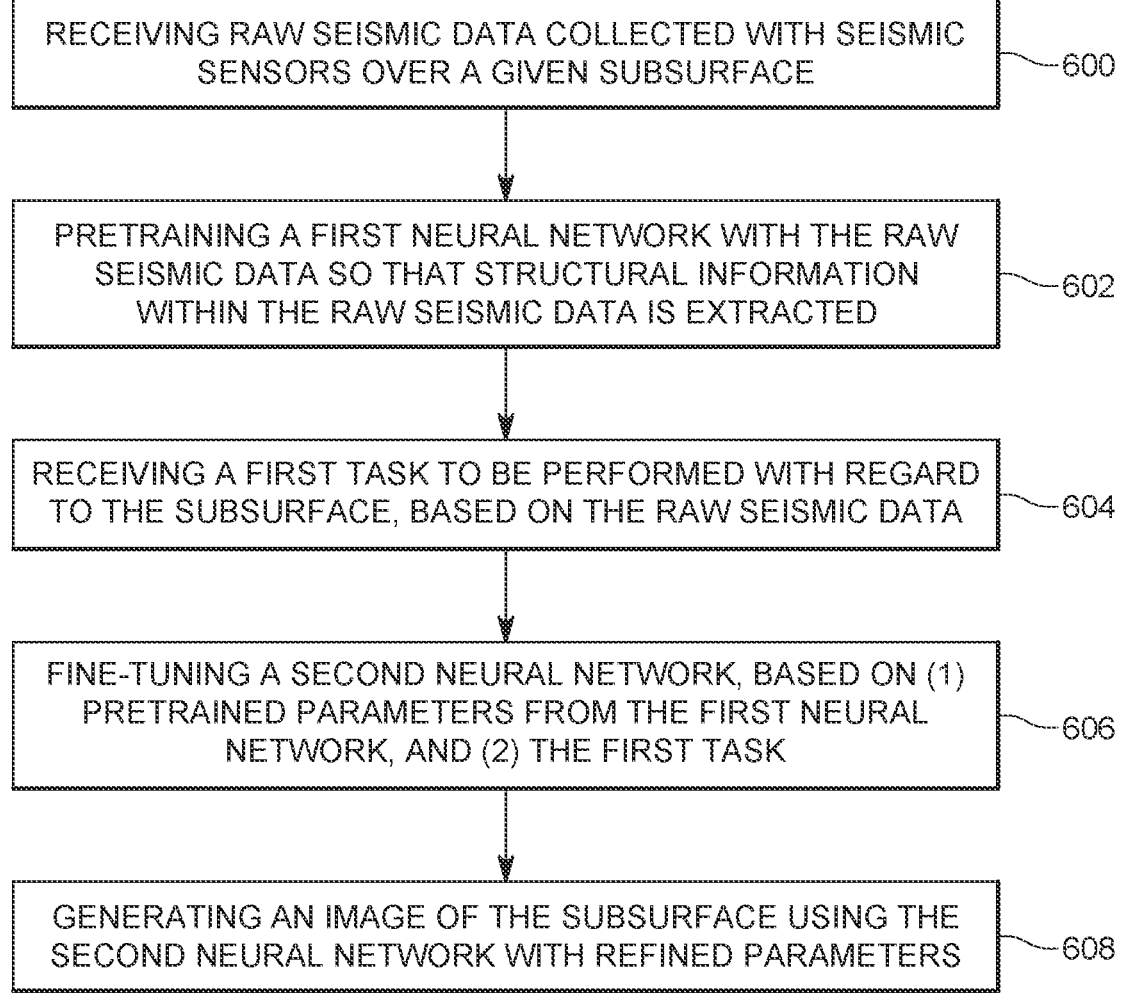

RECEIVING RAW SEISMIC DATA COLLECTED WITH SEISMIC SENSORS OVER A GIVEN SUBSURFACE ~600

PRETRAINING A FIRST NEURAL NETWORK WITH THE RAW SEISMIC DATA SO THAT STRUCTURAL INFORMATION WITHIN THE RAW SEISMIC DATA IS EXTRACTED ~602

RECEIVING A FIRST TASK TO BE PERFORMED WITH REGARD TO THE SUBSURFACE, BASED ON THE RAW SEISMIC DATA ~604

FINE-TUNING A SECOND NEURAL NETWORK, BASED ON (1) PRETRAINED PARAMETERS FROM THE FIRST NEURAL NETWORK, AND (2) THE FIRST TASK ~606

GENERATING AN IMAGE OF THE SUBSURFACE USING THE SECOND NEURAL NETWORK WITH REFINED PARAMETERS ~608

FIG. 6

PRETRAINING SYSTEM AND METHOD FOR SEISMIC DATA PROCESSING USING MACHINE LEARNING

REFERENCE TO RELATED APPLICATIONS

This application is a U.S. National Stage Application of International Application No. PCT/IB2021/059174, filed on Oct. 6, 2021, which claims priority to U.S. Provisional Patent Application No. 63/091,482, filed on Oct. 14, 2020, entitled "PRETRAINING FRAMEWORK FOR SEISMIC DATA PROCESSING USING MACHINE LEARNING," the disclosures of which are incorporated herein by reference in their entirety.

BACKGROUND

Technical Field

Embodiments of the subject matter disclosed herein generally relate to a system and method for learning structures from input data, and more particularly, to the use of neural network models to learn the underlying structures in input waveforms data, like for example seismic data, for pretraining or co-training. The trained network embeds waveform data information and features that are common to the wave propagation in a medium. The pretrained model can then be fine-tuned to perform tasks that preferably rely on the pre-learned information and features.

Discussion of the Background

Waveform imaging encompasses waveform data acquisition and processing techniques for generating a profile (image) of an explored object, like underground geophysical formation (which is simply called the subsurface) of the Earth or a human body using ultrasound waves. This profile is a three-dimensional representation of the physical properties of the object that enables those trained in the field to interpret such profiles for medical reasons or Earth discovery, and including the evaluation of the presence or absence of natural resources, including, among others, oil and/or gas, in the subsurface. Enhancing the image of the explored objects is desirable for locating defects, sought-after natural resources, designing exploitation plans and monitoring the exploitation thereof.

The waveform dataset contains valuable information about the object it traveled through as it gets recorded using sensors. With the advancement in artificial intelligence (AI), machine learning (ML) and the availability of the corresponding computational resources, neural networks have been gradually introduced to solve waveform data processing problems. In a supervised learning approach (i.e., an experienced operator "teaches" the neural network which output should be associated with which input during training), conventional machine learning algorithms take raw waveform data as inputs as well as their corresponding labels as output to learn the connections between the input and output. This kind of approach trains the neural network, with the help of the operator and thus, without to learn the internal structure of the waveform data. This is often repeated for every task and performed with conventional neural network configurations. Because of this approach, the training process tends to be slow and potentially has a low accuracy.

In this regard, FIG. 1 shows a typical marine acquisition system 100 for acquiring, specifically seismic datasets. A vessel 102 tows one or more air guns 104, under water, and the detonation of the air guns 104 creates shock waves 106 near the water surface 108. Such waves propagate and reflect from the boundaries of the subsurface layers 110, which exists in the subsurface 112. The subsurface 112 may include various type of rocks, for example, sedimentary rocks 114 and/or impermeable rocks 116, and/or any other type of rocks and also oil and gas reservoirs 117. Seismic sensors or receivers 118, for example, hydrophones or accelerometers, are mounted on streamers 120, which float near the water surface 108 and are also towed by the vessel 102. The seismic sensors 118 record the reflected waves 107 (e.g., by measuring the water pressure or particle velocity associated with the wave). Other acquisition scenarios are followed in the recording of waveform data for other objects.

FIG. 2 shows an image 200 generated based on such recorded wave signals or traces 210-$i$ (note that there are thousands of traces plotted in this figure, one next to the other, the first trace being 210 and the last one in the series of traces being 212). In the figure, the X-axis denotes the offsets (the distance between the source 104 and the receivers 118), while the Y-axis denotes the time of recording. The oil and gas industry, as an example, invert for the subsurface model by processing such records. The record shown in FIG. 2 is an image and can be considered as a two-dimensional signal. A naive way of processing such information would be passing the raw pixels of such an image into a device or an algorithm for analysis. However, the seismic signal is a highly structured dataset. For example, as indicated by the dashed curve 202 in FIG. 2, moveout information (the travel time versus offset) can be identified from the record and it links different events across the offsets. Another example of structured information in the records are the features corresponding to the amplitude versus offset (AVO) behavior. Thus, a more advanced way of processing seismic datasets would be based on analyzing and understanding that structural information in the recorded data.

With the advances in statistics and high-performance computing, artificial intelligence and machine learning algorithms have recently shown their potential in solving complex problems even those beyond human's ability, such as mastering the Go game and Starcraft II games. Meanwhile, geophysicists have tried to apply machine-learning algorithms to seismic data processing tasks, such as interpolation, de-noising, velocity analysis, etc.

Taking the supervised learning as an example, those algorithms can be summarized as follows (based on FIG. 3): the neural network 300 takes the raw seismic data set 302 as input and outputs the predicted label 304, and then a loss function 306 is used for measuring the distance between the predicted (output label 304) and the true labels 308. The loss function is minimized or maximized to reduce the distance between the predicted label 304 and the true labels 308. To train the neural network 300, a gradient descent algorithm, as an example, is used for updating the neural network 300's parameters. After training, the trained neural network 300 can be used directly, e.g., given new raw data and outputs desirable processed datasets or labels.

Taking the de-noising task as an example, the raw input 302 would be seismic data with noise, while the corresponding label 304 for training would be noise-free datasets. In this case, a typical choice for the neural network 300 would be a convolution neural network (CNN). Thus, after the neural network 300 has been trained, given a noisy seismic dataset, the neural network 300 is expected to output clean datasets when new noisy seismic data is provided.

However, the afore-mentioned conventional machine learning seismic data processing algorithms have the following two drawbacks:

(1) Structural information within the waveform datasets has to be learned from scratch. As discussed earlier, the waveform dataset is highly structured reflecting the laws of physics of wave propagation, such as the moveout and AVO. Conventional machine learning algorithms take the raw seismic data sets and spends a lot of effort learning the structural information. Such structural information can be useful for many seismic processing tasks, e.g., moveout information is useful for interpolation, velocity analysis, and de-noising. A proper pretraining of such structural information will make the neural network learn faster and produce a more robust result than training with raw seismic datasets.

(2) Machine learning waveform processing modules are task specific. This means that a data processing flow consists of multiple steps, such as static correction, first arrival picking, interpolation, de-multiples, velocity analysis, and migration. Note, all those processing steps take the same input, i.e., the recorded seismic data. Conventional machine learning algorithms are developed for each of those processing steps and traditionally, every step has its unique neural network. Thus, training of the neural networks for different tasks are done independently, although the same input data is used for all these tasks. This makes the knowledge learned by the neural network for one specific task to be nontransferable to other tasks, and at the same, more computation power is dedicated to training all those isolated neural networks for different processing steps.

(3) In spite of the convolutional neural networks ability to capture structure features, these features are often spatial local, and miss the big picture of the makeup of waveform data. On the other hand, attention layers often used for natural language processing do not suffer from this localization weakness, and is able to capture better the global trend of waveform geometry and structure.

Thus, there is a need for a new system that is capable of learning the structural information existing in the collected seismic data and sharing that information for whatever task is selected.

BRIEF SUMMARY OF THE INVENTION

According to an embodiment, there is a method for processing waveform data for determining a characteristic inside an object. The method includes receiving raw waveform data collected with waveform sensors over a given object, pretraining a first neural network with the raw waveform data so that structural information within the raw waveform data is extracted, receiving a first task to be performed with regard to the object, based on the raw waveform data, fine-tuning a second neural network, based on (1) pretrained parameters from the first neural network, and (2) the first task, and generating an image of the object using the second neural network with refined parameters.

According to another embodiment, there is a computing device for processing waveform data for determining a characteristic of an object. The computing device includes an input/output interface configured to receive raw waveform data collected with waveform sensors over a given object and a processor connected to the input/output interface. The processor is configured to pretrain a first neural network with the raw waveform data so that sequential structural information within the raw waveform data is extracted, receive a first task to be performed with regard to the given object, based on the raw waveform data, fine-tune a second neural network, based on (1) pretrained parameters from the first neural network, and (2) the first task, and generate an image of the object using the second neural network with refined parameters.

According to yet another embodiment, there is a non-transitory computer readable medium including computer executable instructions, wherein the instructions, when executed by a processor, implement a method for processing waveform data for determining a characteristic of an object, as discussed above.

BRIEF DESCRIPTION OF THE DRAWINGS

For a more complete understanding of the present invention, reference is now made to the following descriptions taken in conjunction with the accompanying drawings, in which:

FIG. 6 is a flow chart of a method for generating an image of a subsurface using the neural network system of FIG. 4.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic data to which a sequence-to-sequence model for the neural network is applied, and this model was previously applied for determining contextual relations between words in a sentence. However, the embodiments to be discussed next are not limited to such model, but may be applied to other models that are capable of learning the structural information of the input raw data. Further, the embodiments discussed next are not limited to seismic data, but can be applied to any waveform data (electromagnetic, ultrasound, gravity) that is acquired with one or more sensors for detecting the structure of an object, e.g., radars, medical scanners (computer tomography, magnetic resonance imagining, etc.).

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel unified framework for robust and efficient training and implementation of machine learning algorithms for waveform data (e.g., seismic data) processing is introduced. In a first aspect, a sequence to sequence (seq2seq) model is first pretrained and then, in a second aspect, the seq2seq model together with the neural network for downstream tasks is fine-tuned. The proposed approach develops a framework for such networks in learning the features and abstractions of waveform (like seismic) data (and processing). As a result, the pretraining step would learn the structural information within the dataset and in the fine-tuning step, with the aid of the learned features/parameters from the seq2seq model, the downstream tasks would be trained more efficiently and can perform tasks better than existing approaches. Thus, a new paradigm in machine learning waveform data is introduced by utilizing networks dedicated to learning the structural information in general seismic data, prior to devoting the network to a particular downstream task.

Figure 3:
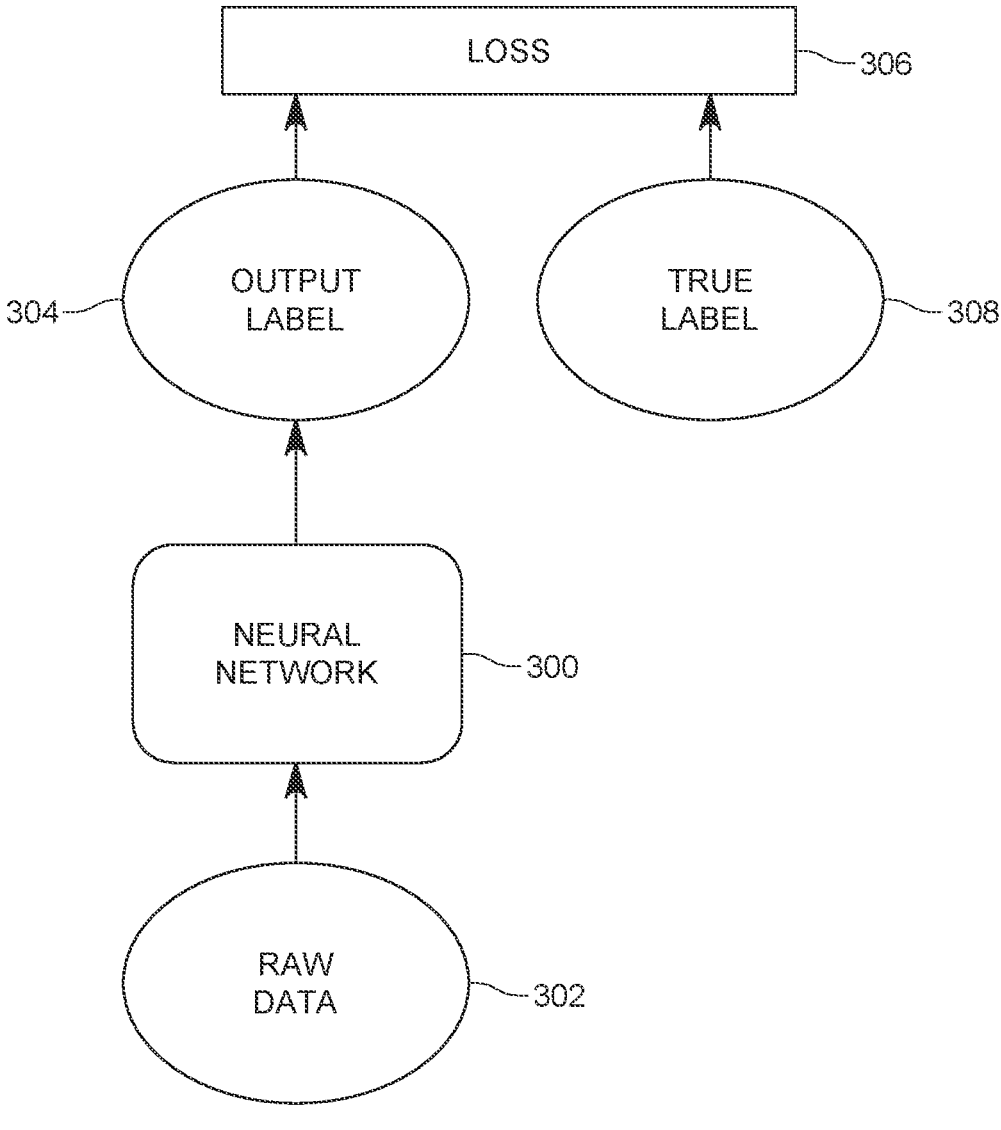
FIG. 3 schematically illustrates a neural network that uses seismic data as input.
Figure 4:
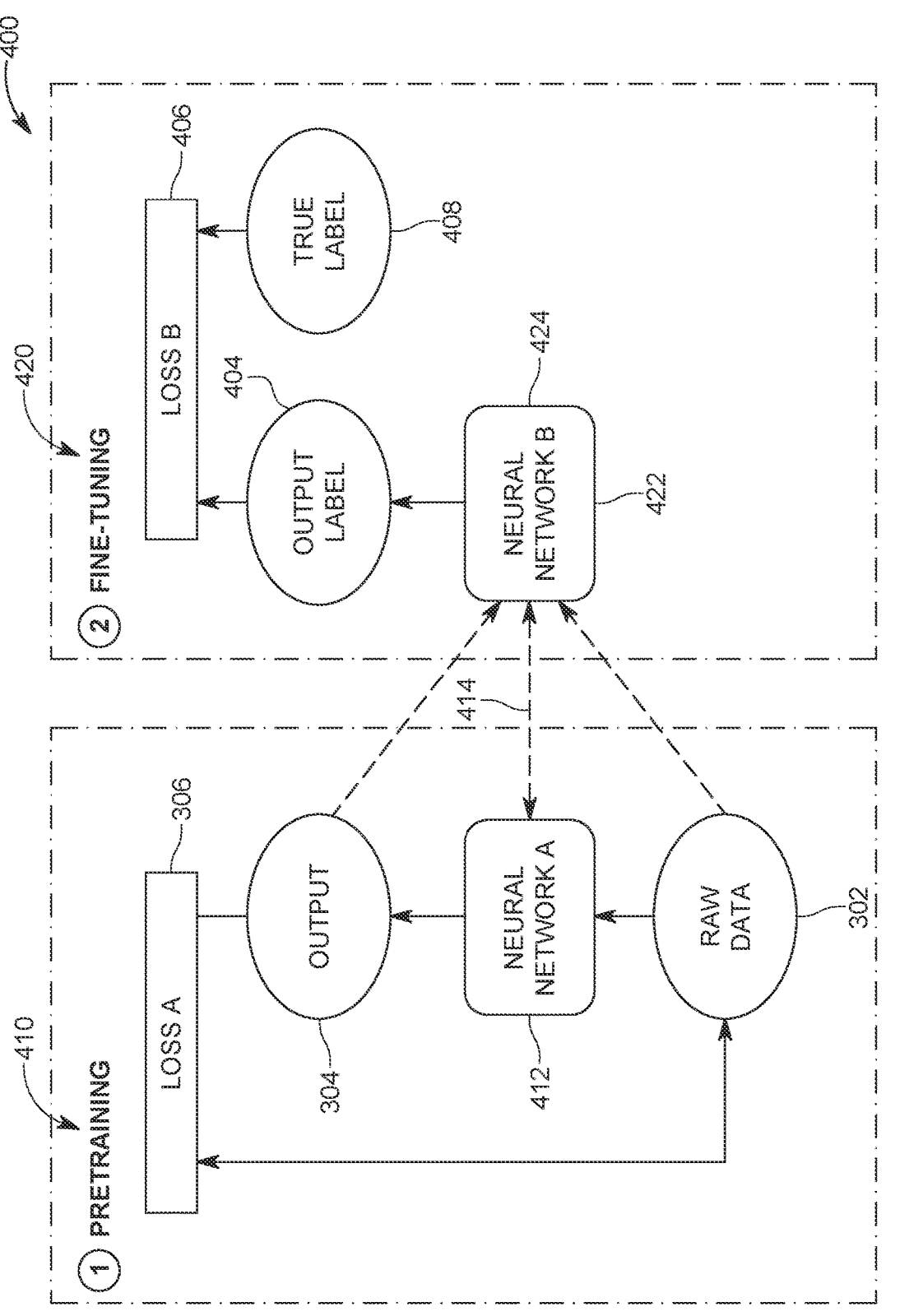
FIG. 4 schematically illustrates a novel neural network system that pretrains the network with seismic data and then uses the pretrained parameters for various task that share the same seismic data.

The motivation for implementing this two-step approach is that as the input for all the processing tasks for waveform analysis is the same, i.e., the acquired seismic data, it is beneficial to perform a pretraining step on the acquired dataset at first and then fine-tune with the downstream extension of the network for different processing tasks. This approach is schematically illustrated in FIG. 4 and includes two modules, the pretraining module 410 and the fine-tuning module 420, which are implemented into a computing device 400, which is discussed later. The pretraining module 410 is configured to use an unsupervised learning algorithm (neural network A 412), i.e., no labels are needed to "teach" or provide info to this stage. The pretraining is performed on the raw waveform data 302. In the sense of unsupervised learning, the neural network A 412 can take the same input 302 and output 304 and try to learn the structure within the waveform dataset 302. Note that the neural network A 412 is selected in this module to be different from the neural network 300 in FIG. 3, so that the structural information of input data 302 can be determined. In this regard, the neural network A 412 used here is similar to an autoencoder.

In this embodiment, a sequence to sequence (seq2seq) model, such as the BERT [1] is used. BERT makes use of the Transformer framework, and specifically the encoder part, an attention mechanism that learns contextual relations between words (or sub-words) in a text. In its basic form, the Transformer includes two separate mechanisms, an encoder that reads the text input and a decoder that produces a prediction for the task. Note that in these steps, the weight of the seq2seq model of neural network A 412 is initialized with a random value for training.

The fine-tuning module 420 fine-tunes the neural network B 422 with information from the neural network A 412 for the downstream task. In other words, by fine-tuning the neural network A 412 it is obtained the neural network B 422. In one application, the neural network B 422 is nothing else than the neural network A 412. However, in another embodiment, the neural network B 422 includes the neural network A 412 and one or more additional layers. Note that in this embodiment, the weights of the neural network B 422 are initialized with the parameters 414 obtained from the pretraining steps. If the neural network A 412 is fine-tuned to become another neural network C, for a different downstream task, it is possible to have another copy of the neural network A 412 and then proceed with the training. This means the pre-trained model obtained in the first module 410 would be utilized by many downstream tasks in the module 420. The fine-tuning module 420 may use the raw data 302 for generating new output label 404, that is determined based on the now known structural information (extracted into the parameters 414) of the input raw data 302. Another loss function 406 (or the same one as in the pretraining module 410) is used by the fine-tuning module 420 to compare the output label 404 with the true label 408. The two modules 410 and 420 of the system 400 are now discussed in more detail.

Figure 1:
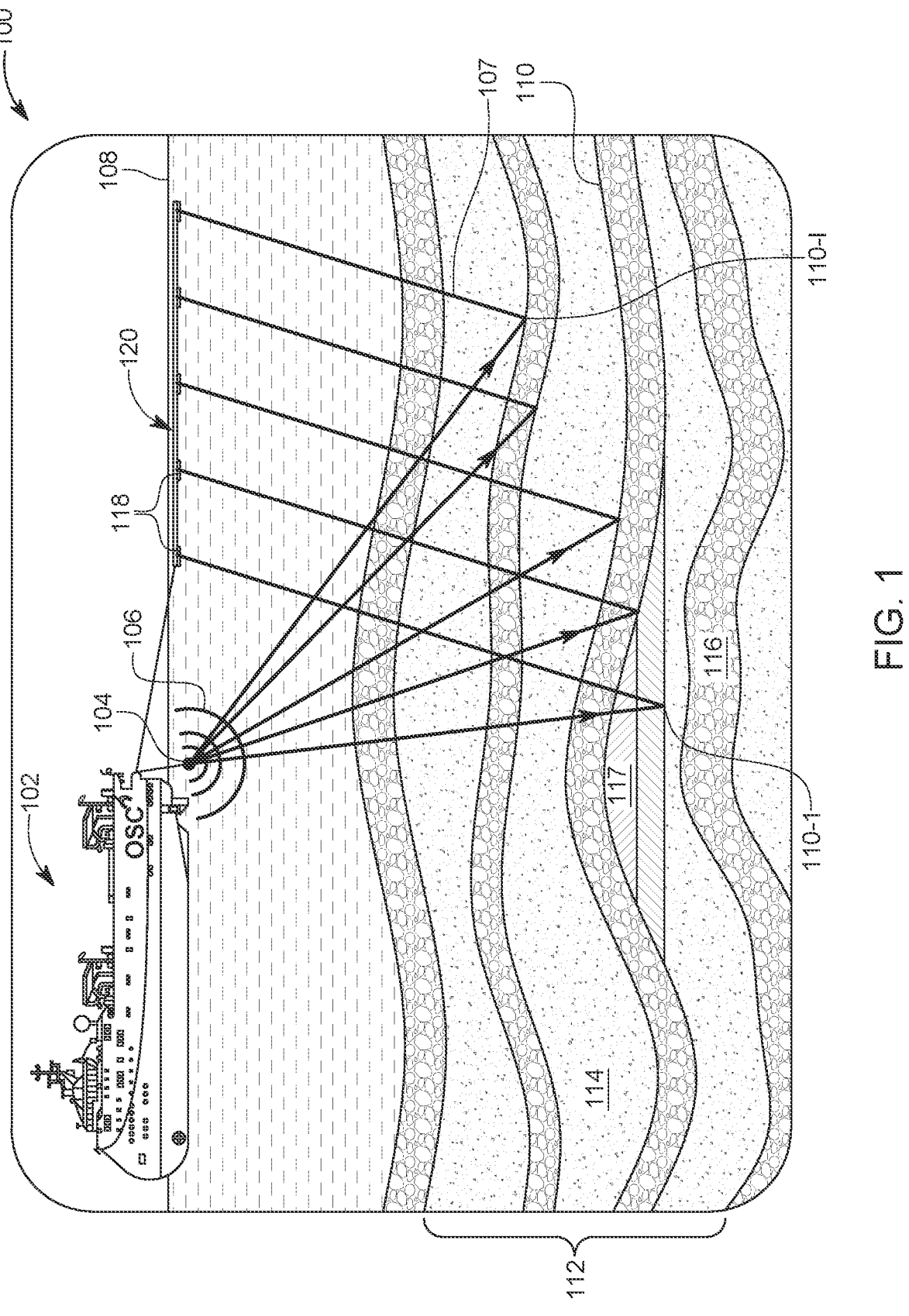
FIG. 1 is a schematic diagram of a marine seismic data acquisition system, as an example of acquired waveform data.
Figure 2:
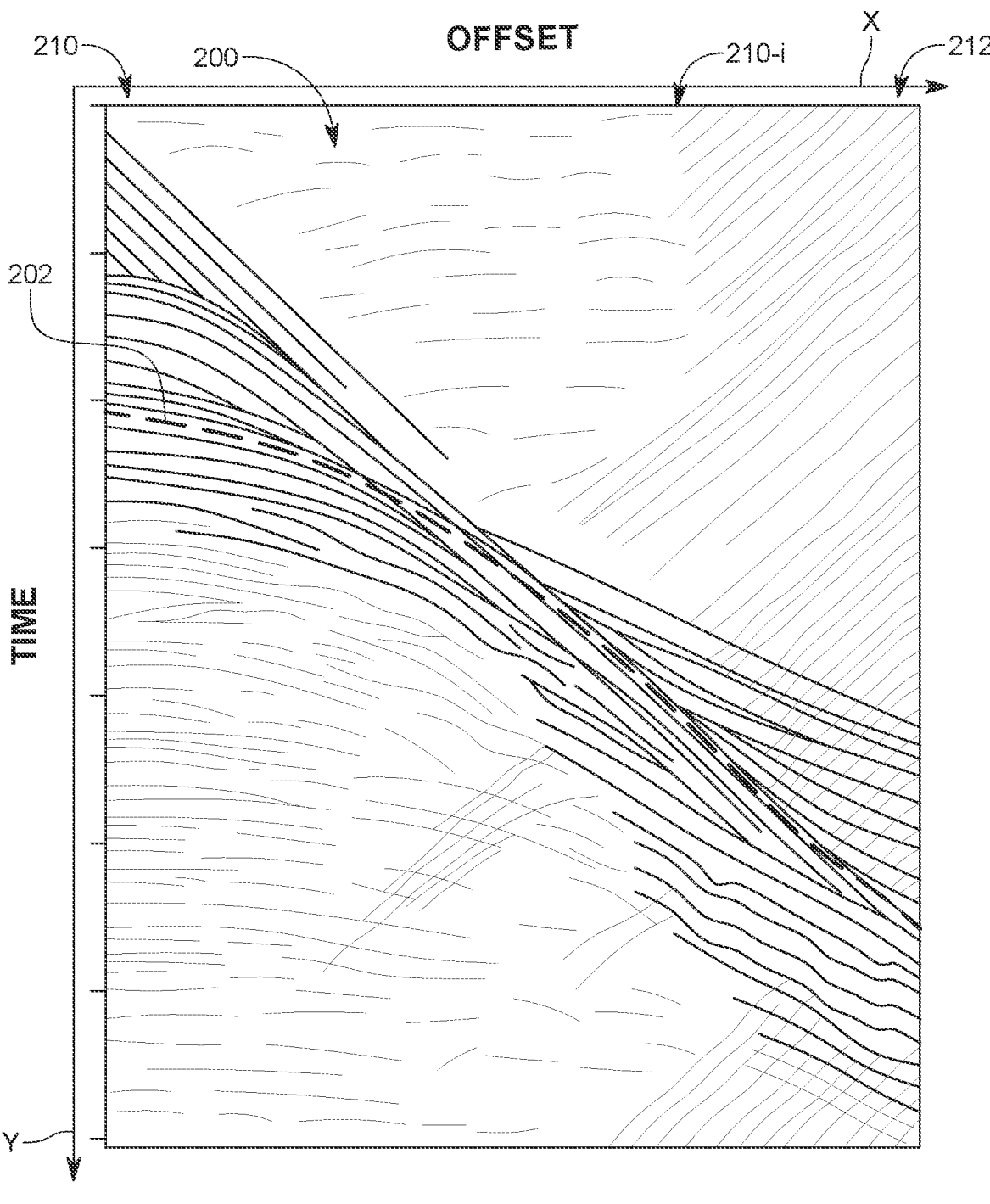
FIG. 2 is an image of a subsurface of the earth acquired with the acquisition system of FIG. 1.

Pretraining is an important concept in machine learning. It aims at learning the structural information of an input data automatically, without supervision. Recently, in natural language processing (NLP), a pretraining model such as the BERT, or GPT [2] showed great success. In this embodiment, BERT is used as the neural network A 412 for pre-training the waveform datasets 302. However, other similar algorithms, e.g., GPT, may be used. BERT was developed for pretraining sentences in NLP. Thus, this neural network needs to be modified to be applicable to waveform data 302, which includes plural traces 210-$i$, as illustrated in FIG. 2. Because each trace of the traces 210-$i$ is associated with a unique distance that characterizes the distance between the source 104 and a corresponding receiver 118 that recorded the trace 210-$i$, it is considered that there is a specific order in which the traces 210-$i$ are arranged in FIG. 2, i.e., first is the trace 210 recorded closest to the source 104, then the next trace is further away from the source 104, and so on until the last trace 212, which is the furthest from the source 104 is plotted in FIG. 2. This unique order of the traces 210-$i$ reflects the subsurface structure determined by the layers 110-1, . . . , 110-I, where it can take any value. In other words, the order of the recorded traces 210-$i$ along the streamer 120 contains sequence and structural information associated with the various layers 110-I of the subsurface 112, and this information can be extracted by the neural network A 412 when implemented as BERT or similar algorithm, but not when implemented as a neural network 300 as illustrated in FIG. 3. This means that it is necessary to adapt BERT (which is a language analyzing neural networks) to pretraining of the waveform dataset, which can be achieved in this embodiment by replacing the mapping of a sentence to another sentence, with the mapping of one record of waveform data to itself, and the words in a sentence of the original BERT algorithm are replaced by traces of the waveform data 302. Thus, a record of waveform data acts like a sentence with each trace being a word in the sentence, and with the objective of the model, like the BERT, being to learn the patterns in the input sentences (seismic data records).

Figure 5:
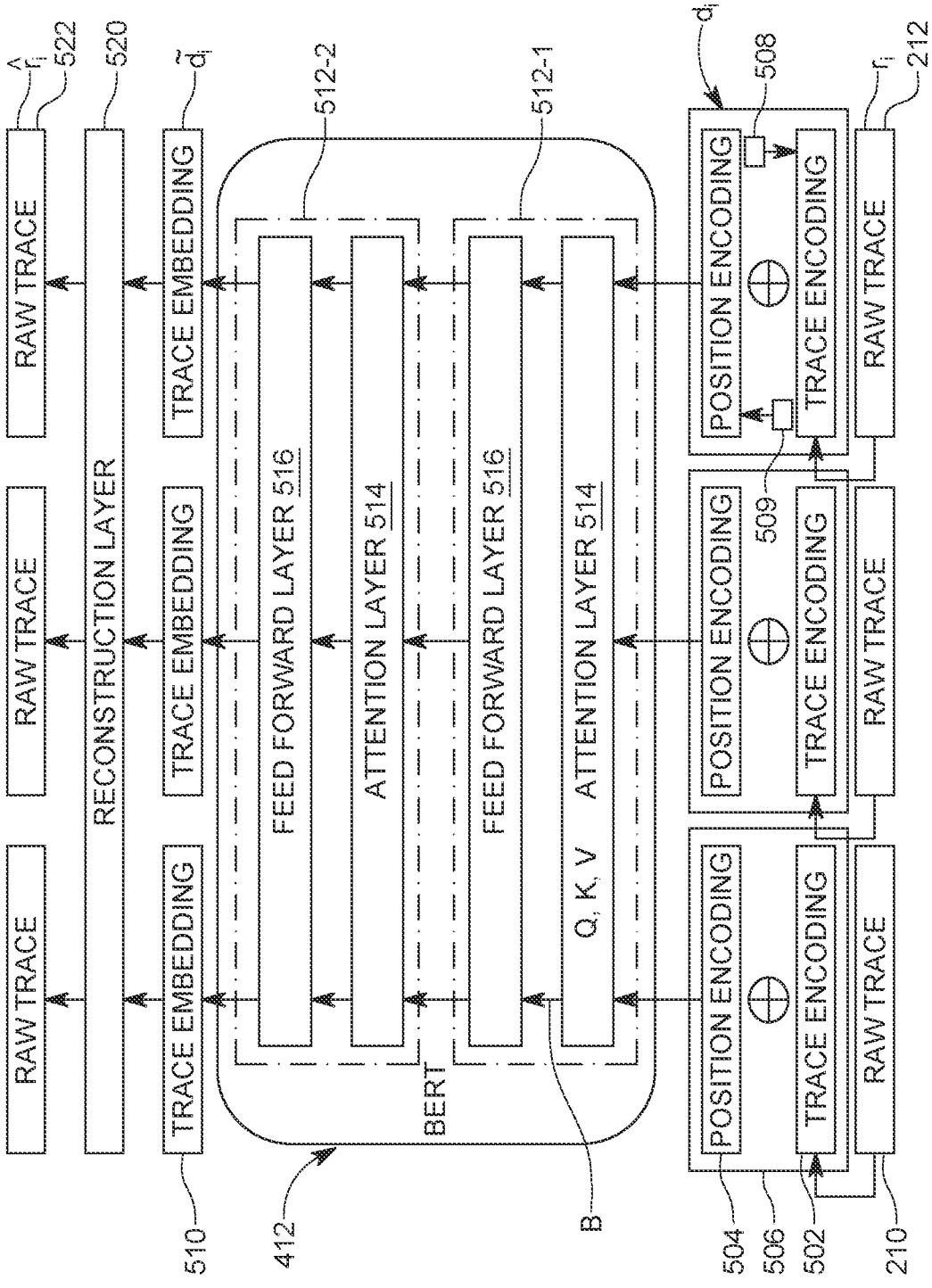
FIG. 5 schematically illustrates the layer structure of a pretraining module of the neural network system of FIG. 4.

More specifically, according to an embodiment, as shown in FIG. 5, the neural network A 412 is configured to project one trace 210-$i$ of waveform data 302 into a so-called trace encoding 502 (the figure shows only three traces for simplicity, but any number of traces may be used). In reality, a typical record 210-$i$ includes hundreds of such traces. The trace encoding is then followed by a position encoding 504, where the "position" corresponds to the position along the stream where a specific trace has been recorded. The trace encoding and the positional encoding lead to the input for the neural network A 412, and this step is referred to as initial trace embedding 506.

The initial trace embedding 506 is now discussed. Suppose that one trace 210 of the raw waveform signal 210-$i$ is denoted as $r_i$, where "i" denotes the trace's position index (i.e., offset or receiver coordinates in a common shot gather, on axis X on FIG. 2). The embedding $d_i$ (both trace and position encoding) of the trace $r_i$ could be, in one application, described by:

$$d_i = E_1(r_i) + E_2(r_i), \tag{1}$$

where $E_1$ denotes one or more layers of a neural network 508 (which can be different from the neural network A 412 and/or the neural network B 424) or a function that projects the raw seismic trace into an embedding, and $E_2$ denotes another one or more layers of a neural network 509 (which can be different from the neural network A 412 and/or the neural network B 424 and/or the neural network 508) or a function that computes the position encoding for the trace at position "i". The fact that $E_1$ and $E_2$ are one or more layers of a neural network means that such encoding strategy will be learned by the model 412 simultaneously when being trained. If the encodings $E_1$ and $E_2$ are functions, it is assumed that they are already defined before the training of the model. For example, it is possible to use the Fourier transform for $E_1$ and a typical position encoding formula for $E_2$, which is based on the sine and/or the cosine encoding, as follows:

$$E_2(i) = \begin{cases} \sin\left(i/10000^{i/d_{model}}\right) & \text{if } i \text{ is even} \\ \cos\left(i/10000^{(i-1)/d_{model}}\right) & \text{if } i \text{ is odd} \end{cases}, \tag{2}$$

where $d_{model}$ is the vector size of the trace embedding.

The initial trace embedding 506 is provided as input to the neural network 412, which is the BERT model in this embodiment. The neural network 412 uses this input 506 and outputs a corresponding final optimized trace embedding 510. The neural network 412 has in this embodiment plural identical blocks 512-1 and 512-2, each block including an attention layer 514 and a feed forward layer 516, whose functionality are known in the art, and thus not described herein. Note that any number of blocks may be used for the neural network 412. The trace embeddings 510 may be grouped in matrix form as:

$$D = [d_0, d_1, \ldots, d_i, \ldots]. \tag{3}$$

The attention layers 514 will first project the trace embedding 506 to the query Q, the key K, and the value V, using three different matrices:

$$Q = W_Q D, K = W_K D, \text{ and } V = W_V D. \tag{4}$$

Then, an output B is computed with an attention mechanism of layer 514, defined as:

$$B = \text{Attention }(Q, K, V) = \text{softmax}\left(\frac{QK^T}{\sqrt{d_{model}}}\right)V, \tag{5}$$

where T is the transposed operation. Note that other attention mechanisms may be used.

In one application, it is possible to consider that the attention layer tries to find the relation between different traces by cross-correlation between the query Q and the key K and the output B is the weighted sum of the value V. The weight is defined by the softmax of the cross-correlations $x_i$:

$$\text{softmax }(x)_i = \frac{e^{x_i}}{\sum e^{x_i}}. \tag{6}$$

Note that each column of the output B corresponds to different traces:

$$B = [b_1, b_2, \ldots b_i, \ldots]. \tag{7}$$

The output B from the attention layer 514 then goes through the feed-forward layer 516 and the final output of this layer is the final trace embedding 510, i.e., $$\tilde{d}_i = \text{FeedForward}(b_i). \tag{8}$$

Then the output $\tilde{d}_i$ can be considered as the output of the neural network 412, or the input for an extra layer 512-2 of the neural network 412, so that this output may go through another attention and feedforward layers.

To reconstruct the raw waveform $r_i$ from the output $\tilde{d}_i$, a reconstruction layer 520 is added at the end of the neural network 412. The reconstruction layer 520 generates reconstructed waveforms $\hat{r}_i$ 522 for each input trace $r_i$. The reconstruction layer 520 is only used for training the neural network and will be dropped after the pretraining steps are finished. The reconstruction layer 520 is defined as:

$$\hat{r}_i = \text{Reconstruction}(\tilde{d}_i). \tag{9}$$

The reconstruction layer 520 depends on how the one or more layers or function $E_1$ is defined in equation (1). The reconstruction layer 520 may be one or more layers of a neural network if, in equation (1), one or more layers of a neural network are used for $E_1$ for projecting the raw seismic data 210 into a trace encoding 506. The reconstruction layer 520 may also be defined as a function, e.g., if $E_1$ is the forward Fourier transform. Then, the reconstruction layer 520 should be an inverse Fourier transform which transforms the trace embedding to the raw waveform.

The loss functions 306 and 406 in the two modules 410 and 420 may be an L2 norm (or other functions used in the art) to formulate the loss function for training:

$$L = \frac{1}{2}\|\hat{r}_i - r_i\|_2^2. \tag{10}$$

During the training stage, a similar procedure may be adopted to that used in training the BERT model in NLP. For example, it is possible to randomly mute a fraction of the traces (e.g., 15%) in the input, i.e., set $r_i = 0$ for that fraction and formulate the loss at those muted positions. The aim is to push the BERT model to learn to predict the missing traces and, as a result, to learn the structural information within the waveform data 302.

Having trained the neural network A with the waveform data 302, the pretrained parameters 414 are now used for the neural network B in the fine-tuning module 420, when a specific waveform related task is implemented in the neural network B. These parameters 414 are fine-tuned using labeled data from the specific downstream task. For example, if the task is to extract moveout information from a seismic shot gather (the travel time versus offset), then the neural network B in the fine-tuning module 420 is fine-tuned using the moveout information as the label. If the task is to predict or determine amplitude versus offset behavior, then the neural network B in the fine-tuning module 420 is fine-tuned using this kind of data as the label. In other words, the pretrained parameters 414 from the pretraining module

410 are applied to the neural network B of the fine-tuning module 420, and then the neural network B with the pre-trained parameters 414 is further trained, i.e., fine-tuned, so that the neural network B operates with fine-tuned parameters 426, based on the task specific seismic data.

In one application, each downstream task has its own separate fine-tuned model, even though these models are initialized with the same pre-trained parameters 414. In other words, if the task is related to the moveout information, a moveout information model is used for the neural network B. If the task is related to the amplitude versus offset behavior, then an amplitude versus offset behavior model is used for the neural network B. In one application, it is possible to use the final output trace embedding 510 from the pretrained module 410 as the input for the down-stream tasks in the fine-tuning module 420, or it is possible to use the intermediate trace embedding (if multiple BERT blocks were used), as well as the final output trace embedding as the input for downstream tasks. It is expected that the intermediate and final trace embedding still contain the structural information related to the original traces and records, and thus, they can better train and perform the downstream tasks. In one application, it is also possible to add a regularization term in the fine-tuning steps, which controls the deviation of the fine-tuned BERT model from the pre-trained one to stabilize the fine-tuning training process.

Variations of one or more steps or elements or modules discussed above may be possible without changing the scope of the invention. A couple of such variations are now discussed. The trace embedding 506 is computed using trace encoding 502 and position encoding 504 as illustrated in FIG. 5. However, other encodings can be used and/or added in to form additional encoding. For example, an extra encoding term may be added to identify whether the trace belongs to a horizontal or vertical component recording when dealing with multi-component datasets (similar for the pressure wavefield and the particle velocity components). The embodiments discussed above suggest the embedding of each single trace (see again FIG. 5), but other forms of embedding can be utilized, such as embedding of multiple traces.

The raw input seismic dataset 302 can be something different from traces recorded with seismic sensors, for example, it can be well-logs. In this case, the position-encoding need to be specially designed to accommodate the 2D variations of well log space coordinates. In one application, the raw input seismic datasets for training can be pre-stack or post-stacks datasets. In yet another application, which can be combined with any of the above embodiments or applications, the raw input seismic datasets can be in other domains, such as the Radon domain or Frequency domain, the Wavelet, or Curvelet Domains.

In one application, which can be combined with any of the above embodiments or applications, the raw input seismic dataset can be organized in the ensembles of common shot, common receiver, common middle point, common azimuth, or common reflection angle configuration.

In still another application, which can be combined with any of the above embodiments or applications, the BERT model may be replaced with other pretraining models, like GPT, Transformer-XL [3], XLNet [4], fastBERT [5], RoBERTa [6], ALBERT [7], etc. Further, it is noted that there are no restrictions for the downstream tasks, it can be a supervised learning problem as discussed herein, or an unsupervised learning algorithm such as meta-learning, or reinforcement learning. No matter what downstream task is performed, the ultimate goal of the methods discussed herein is to generate an image from the waveform data of the object of investigation (i.e., oil and/or gas reservoir 117 that lies underground, so that the oil and gas service companies would know where to drill a well for oil exploration). In other words, by using the modules 410 and 420 discussed above, an improvement in the technical field of object discovery and exploration (i.e., oil and gas exploration) is achieved as a more accurate representation of the explored objective (i.e., of the oil and gas reservoirs is achieved). This improvement is partially due to the fact that the neural network A is configured to extract the structural and global sequential information associated with the recorded traces using a new mechanism, given by attention layers, which was not previously possible. While the above embodiments have been discussed in the context of marine explorations, the teachings from these embodiments are equally applicable to land exploration, i.e., to the traces recorded on land when the seismic source is either distributed on the earth's surface, or in one or more wells.

A method for processing seismic data, based on the embodiments discussed above, for determining oil and gas reservoirs is now discussed with regard to FIG. 6. The method includes a step 600 of receiving raw seismic data 302 collected with seismic sensors 118 over a given sub-surface 112, a step 602 of pretraining a first neural network 412 with the raw seismic data 302 so that structural information within the raw seismic data 302 is considered, a step 604 of receiving a first task to be performed with regard to the subsurface, based on the raw seismic data, a step 606 of fine-tuning a second neural network 422, based on (1) pretrained parameters 414 from the first neural network 412, and (2) the first task, and a step 608 of generating an image 200 of the subsurface 112 using the second neural network 422 with refined parameters 424. In one application, the first neural network is different from the second neural network. In another application, the second neural network includes the first neural network and at least one more layer. In still another application, the first neural network uses a sequence to sequence model.

The first neural network maps the raw seismic data to the raw seismic data, and the traces of the raw seismic data are considered to form a sentence so that an order of the traces in the sentence constitutes the structural information. The second neural network uses as input the raw seismic data. The step of pretraining includes encoding traces forming the raw seismic data with a first layer of a third neural network, and/or encoding a position of the traces in the raw seismic data with a first layer of a fourth neural network, wherein a result of the encoding steps is a trace embedding, and/or applying an attention layer of the first neural network to the trace embedding, and/or applying a feed forward layer of the first neural network to a result of the attention layer, which generates an optimized trace embedding, and/or reconstructing an original raw trace from the optimized trace embedding.

Figure 7:
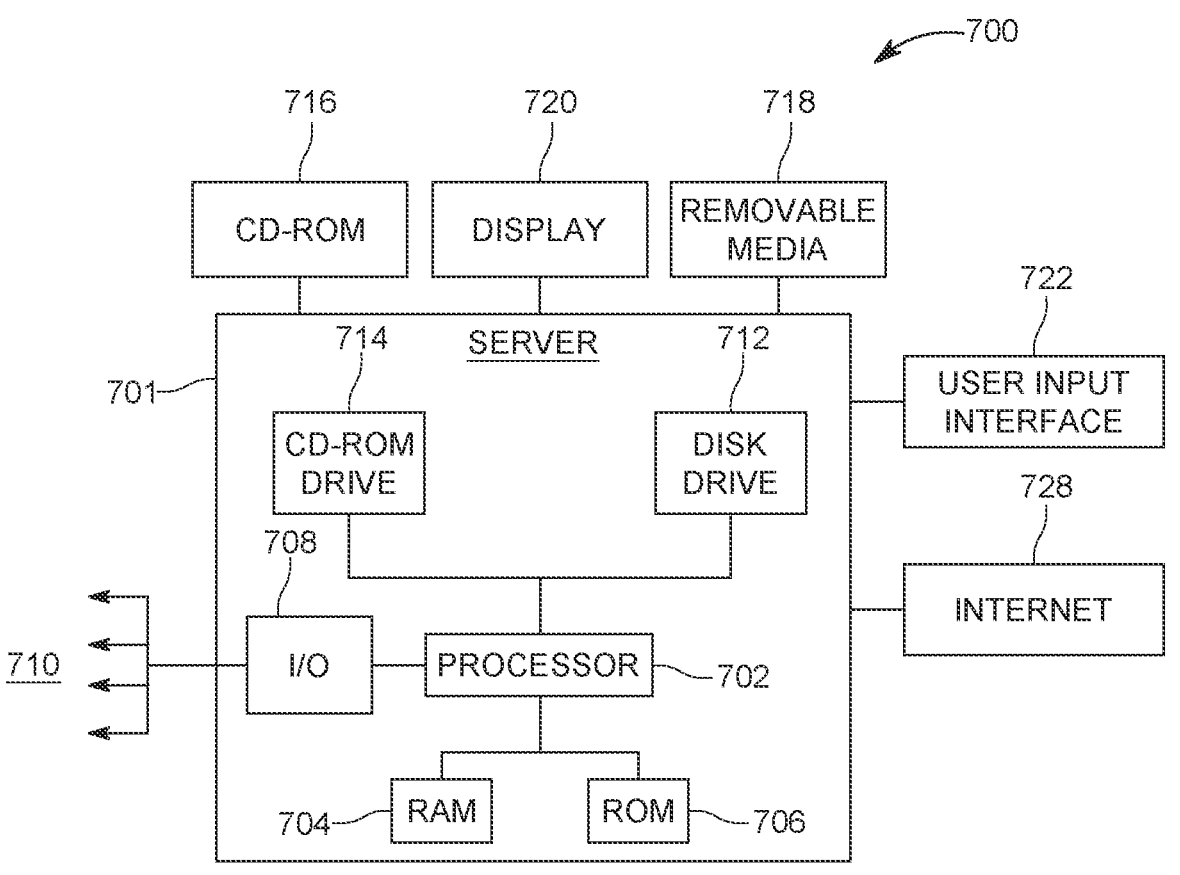
FIG. 7 schematically illustrates a computing device that implements one or more of the methods discussed herein.

The above-discussed procedures and methods may be implemented in a computing device as illustrated in FIG. 7. Hardware, firmware, software or a combination thereof may be used to perform the various steps and operations described herein. Computing device 700 of FIG. 7 is an exemplary computing structure that may be the computing device 400 illustrated in FIG. 4.

A computing device 700 suitable for performing the activities described in the exemplary embodiments may include a server 701. Such a server 701 may include a central processor (CPU) 702 coupled to a random access memory

US 12,614,072 B2

11 12

(RAM) 704 and to a read-only memory (ROM) 706. ROM 706 may also be other types of storage media to store programs, such as programmable ROM (PROM), erasable PROM (EPROM), etc. Processor 702 may communicate with other internal and external components through input/ output (I/O) circuitry 708 and bussing 710 to provide control signals and the like. Processor 702 carries out a variety of functions as are known in the art, as dictated by software and/or firmware instructions.

Server 701 may also include one or more data storage devices, including hard drives 712, CD-ROM drives 714 and other hardware capable of reading and/or storing information, such as DVD, etc. In one embodiment, software for carrying out the above-discussed steps may be stored and distributed on a CD-ROM or DVD 716, a USB storage device 718 or other form of media capable of portably storing information. These storage media may be inserted into, and read by, devices such as CD-ROM drive 714, disk drive 712, etc. Server 701 may be coupled to a display 720, which may be any type of known display or presentation screen, such as LCD, plasma display, cathode ray tube (CRT), etc. A user input interface 722 is provided, including one or more user interface mechanisms such as a mouse, keyboard, microphone, touchpad, touch screen, voice-rec-ognition system, etc.

Server 701 may be coupled to other devices, such as sources, seismic receivers, etc. The server may be part of a larger network configuration as in a global area network (GAN) such as the Internet 728, which allows ultimate connection to various landline and/or mobile computing devices.

The disclosed embodiments provide a system and method that apply a neural network to seismic data for extracting structural information associated with the waveform data and also for pretraining the neural network before calculat-ing specific waveform related tasks. It should be understood that this description is not intended to limit the invention. On the contrary, the embodiments are intended to cover alter-natives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Devlin, J., M.-W. Chang, K. Lee, and K. Toutanova, 2018, Bert: Pre-training of deep bidirectional trans-formers for language understanding, arXiv.org>cs>arXiv:1810.04805.
[2] Radford, A., K. Narasimhan, T. Salimans, and I. Sutskever, 2018, Improving language understanding with generative pre-training, https://openai.com/blog/language-unsupervised/.
[3] Dai, Z., Z. Yang, Y. Yang, J. Carbonell, Q. V. Le, and R. Salakhutdinov, 2019, Transformer-xl: Attentive lan-guage models beyond a fixed-length context.
[4] Yang, Z., Z. Dai, Y. Yang, J. Carbonell, R. Salakhut-dinov, and Q. V. Le, 2019, XInet: Generalized autore-gressive pretraining for language understanding.
[5] Liu, W., P. Zhou, Z. Zhao, Z. Wang, H. Deng, and Q. Ju, 2020, Fastbert: a self-distilling bert with adaptive inference time.
[6] Liu, Y., M. Ott, N. Goyal, J. Du, M. Joshi, D. Chen, O. Levy, M. Lewis, L. Zettlemoyer, and V. Stoyanov, 2019, Roberta: A robustly optimized bert pretraining approach.
[7] Lan, Z., M. Chen, S. Goodman, K. Gimpel, P. Sharma, and R. Soricut, 2019, Albert: A lite bert for self-supervised learning of language representations.

What is claimed is:

1. A method for processing waveform data for determin-ing a characteristic inside an underground geophysical for-mation, the method comprising:
receiving raw waveform data collected with waveform sensors over the underground geophysical formation;
pretraining a first neural network with the raw waveform data so that structural information within the raw waveform data is extracted and pretrained parameters of the first neural network are generated;
receiving a first seismic data processing task to be per-formed with regard to the underground geophysical formation, based on the raw waveform data;
fine-tuning a second neural network by using the pre-trained parameters from the first neural network, and generating refined parameters in response to the first task; and
generating an image of the underground geophysical formation using the second neural network with the refined parameters to map the raw waveform data for oil and gas exploration.

2. The method of claim 1, wherein the first neural network is different from the second neural network.

3. The method of claim 1, wherein the second neural network includes the first neural network and at least one more layer.

4. The method of claim 1, wherein the first neural network uses a sequence to sequence model, the raw waveform data is seismic data of the subsurface, and the characteristics is a presence of oil or gas.

5. The method of claim 1, wherein the first neural network maps the raw waveform data to the raw waveform data, and the traces of the raw waveform data are considered to form a sentence so that an order of the traces in the sentence constitutes the sequential and structural information.

6. The method of claim 1, wherein the second neural network uses as input the raw waveform data.

7. The method of claim 1, wherein the step of pretraining comprises:
encoding traces forming the raw waveform data with a first layer of a third neural network; and
encoding a position of the traces in the raw waveform data with a first layer of a fourth neural network,
wherein a result of the encoding steps is a trace embed-ding.

8. The method of claim 7, further comprising:

applying an attention layer of the first neural network to the trace embedding;

applying a feed forward layer of the first neural network to a result of the attention layer, which generates an optimized trace embedding; and reconstructing an original raw trace from the optimized trace embedding.

9. A computing device for processing waveform data for determining a characteristic of an underground geophysical formation, the computing device comprising:

an input/output interface configured to receive raw waveform data collected with waveform sensors over the underground geophysical formation; and a processor connected to the input/output interface and configured to, pretrain a first neural network with the raw waveform data so that sequential structural information within the raw waveform data is extracted and pretrained parameters of the first neural network are generated;

receive a first seismic data processing task to be performed with regard to the underground geophysical formation, based on the raw waveform data;

fine-tune a second neural network by using the pretrained parameters from the first neural network, and generating refined parameters in response to the first task; and generate an image of the underground geophysical formation using the second neural network with the refined parameters to map the raw waveform data for oil and gas exploration.

10. The computing device of claim 9, wherein the first neural network is different from the second neural network.

11. The computing device of claim 9, wherein the second neural network includes the first neural network and at least one more layer.

12. The computing device of claim 9, wherein the first neural network uses a sequence-to-sequence model, the raw waveform data is seismic data of the subsurface, and the characteristics is a presence of oil or gas.

13. The computing device of claim 9, wherein the first neural network maps the raw waveform data to the raw waveform data, and the traces of the raw waveform data are considered to form a sentence so that an order of the traces in the sentence constitutes the structural information.

14. The computing device of claim 9, wherein the second neural network uses as input the raw waveform data.

15. The computing device of claim 9, wherein the processor is further configured to:

encode traces forming the raw waveform data with a first layer of a third neural network; and encode a position of the traces in the raw seismic data with a first layer of a fourth neural network, wherein a result of the encoding steps is a trace embedding.

16. The computing device of claim 15, wherein the processor is further configured to:

apply an attention layer of the first neural network to the trace embedding;

apply a feed forward layer of the first neural network to a result of the attention layer, which generates an optimized trace embedding; and reconstruct an original raw trace from the optimized trace embedding.

17. A non-transitory computer readable medium including computer executable instructions, wherein the instructions, when executed by a processor, implement a method for processing waveform data for determining a characteristic of an underground geophysical formation, the medium comprising instructions for:

receiving raw waveform data collected with waveform sensors over the underground geophysical formation;

pretraining a first neural network with the raw waveform data so that structural information within the raw waveform data is extracted and pretrained parameters of the first neural network are generated;

receiving a first seismic data processing task to be performed with regard to the underground geophysical formation, based on the raw waveform data;

fine-tuning a second neural network by using the pretrained parameters from the first neural network, and generating refined parameters in response to the first task; and generating an image of the underground geophysical formation using the second neural network with the refined parameters to map the raw waveform data for oil and gas exploration.

18. The medium of claim 17, wherein the second neural network includes the first neural network and at least one more layer.

19. The medium of claim 17, wherein the first neural network maps the raw waveform data to the raw waveform data, and the traces of the raw waveform data are considered to form a sentence so that an order of the traces in the sentence constitutes the structural information.

20. The medium of claim 17, wherein the step of pretraining comprises:

encoding traces forming the raw waveform data with a first layer of a third neural network;

encoding a position of the traces in the raw waveform data with a first layer of a fourth neural network, wherein a result of the encoding steps is a trace embedding;

applying an attention layer of the first neural network to the trace embedding;

applying a feed forward layer of the first neural network to a result of the attention layer, which generates an optimized trace embedding; and reconstructing an original raw trace from the optimized trace embedding, wherein the raw waveform data is seismic data of the subsurface, and the characteristics is a presence of oil or gas.

* * * * *